United States Patent
Chambers

(10) Patent No.: US 9,185,524 B2
(45) Date of Patent: Nov. 10, 2015

(54) METHOD AND APPARATUS FOR MAPPING OF MOBILE DEVICES UNIQUE IDENTIFIERS TO INDIVIDUALS

(71) Applicant: Nokia Technologies Oy, Espoo (FI)

(72) Inventor: Paul Chambers, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/755,528

(22) Filed: Jan. 31, 2013

(65) Prior Publication Data

US 2014/0213297 A1  Jul. 31, 2014

(51) Int. Cl.
  *H04W 24/00*  (2009.01)
  *H04W 4/02*  (2009.01)
  *G06Q 10/10*  (2012.01)
  *H04M 1/725*  (2006.01)

(52) U.S. Cl.
  CPC ........... *H04W 4/025* (2013.01); *G06Q 10/1095* (2013.01); *H04M 1/72566* (2013.01)

(58) Field of Classification Search
  CPC ............................... H04W 4/02; H04W 4/025
  USPC ............................................ 455/456.1, 414.2
  See application file for complete search history.

(56) References Cited

U.S. PATENT DOCUMENTS

| | | | |
|---|---|---|---|
| 2006/0107219 A1* | 5/2006 | Ahya et al. | 715/745 |
| 2007/0167136 A1 | 7/2007 | Groth | |
| 2008/0235349 A1 | 9/2008 | Caspi et al. | |
| 2010/0194896 A1* | 8/2010 | Heimendinger | 348/207.1 |

FOREIGN PATENT DOCUMENTS

EP  2 500 854 A1  9/2012

OTHER PUBLICATIONS

European Search Report for Application No. 14151523.9 dated Mar. 19, 2014.

* cited by examiner

*Primary Examiner* — Nathan Mitchell
*Assistant Examiner* — Sayed T Zewari
(74) *Attorney, Agent, or Firm* — Alston & Bird LLP

(57) ABSTRACT

A method, apparatus and computer program product are provided for accessing user data and determining one or more nearby individuals at a first time, receiving one or more device identifiers transmitted from other computing devices, and mapping the one or more device identifiers with the one or more nearby individuals. The method, apparatus, and computer program product may also be configured for determining whether each of one or more device identifiers are mapped to a specific individual, and if not, access stored data from previous occurrences in order to map the device identifiers to specific individuals.

21 Claims, 6 Drawing Sheets

METHOD AND APPARATUS FOR MAPPING OF MOBILE DEVICES UNIQUE IDENTIFIERS TO INDIVIDUALS

TECHNOLOGICAL FIELD

A method, apparatus and computer program product are provided in accordance with an example embodiment in order to enable a mobile device to map unique identifiers of mobile device to individuals that are known to be nearby.

BACKGROUND

The need for collecting information about the user's ambient environment is essential to automated algorithms that deduce the user's current context. Determining that context is important for next generation user experiences. For example, a restaurant locating app may return a different result if a user is with a spouse versus if a user is with a co-worker. A user's ambient environment includes the unique identifiers that can be sensed in use in proximity to the user's device. Uses of those unique identifiers being sent by a transmitter with a static physical location are well known.

A need exists for sensing the unique identifiers of mobile device being carried on the person of individuals in proximity to the user and being able to determine the frequency and time of day that the user is in proximity with the people he/she interacts with. This information is very valuable, for example, in determining a metric called "social distance." Social distance may be used to estimate how close your ties are with that individual and whether they are professional and or personal (e.g. which coworkers your regularly go to lunch with).

To sense unique identifiers in proximity to a user's mobile device, RF based communications methods may be utilized. Mobile devices incorporate a number of RF-based digital communications methods. Examples include various cellular voice and data technologies, Bluetooth, Wi-Fi, and proprietary standards such as ANT. These standards broadcast the signal in an omni-directional pattern, since there is no fixed relationship between the transmitter and receiver, and therefore any appropriately equipped receiver within range can receive the signal. These RF-based digital communication methods incorporate two unique identifiers, so that a transmitter can indicate whom the transmission is intended for, and where the intended receiver should send the response (if any). Collecting the identifiers of RF-based devices that have a fixed physical location (cell towers, Wi-Fi access point in buildings) and correlating these with additional information about geo-location is also well known (e.g. skyhook and similar) to improve the accuracy of positioning, particularly indoors. This may be a database of cell tower locations and triangulation, or last know GPS locations for a mobile device. Digital implementations for multi-user shared calendars are also well known and understood. Support for this functionality is also commonplace on mobile devices.

Currently, a user's mobile device may sense the unique identifiers, but does not know what individual's device the transmission is coming from. And therefore, the unique identifiers alone are not capable of providing any information that may help determine a user's current context. Furthermore, a user's mobile device may know what individuals a person is with if a calendar entry is made, but without the calendar entry, is unable to determine what individuals are in proximity.

Consequently, a need also exists for a method to utilize accessible information regarding who a user is with in conjunction with sensed unique identifiers to map those unique identifiers to specific individuals in order to provide a user's current context.

BRIEF SUMMARY

The present invention relates to sensing unique identifiers in proximity to a user's mobile device and correlating those visible unique identifiers that the user's mobile device can detect against people that are known to be nearby, such as attendees of a meeting. Over time (multiple meetings), by a process of elimination, it would be possible to determine which meeting attendee is associated with which unique identifier. Many RF-based digital communications methods incorporate human-readable identifiers in additions (e.g. 'Paul's phone') which may also be factored in as 'hints', to speed up the process. Once the mapping from unique identifiers to people has been identified, the mobile device can start tracking frequency and time of day for interactions based on proximity.

Additional/alternative embodiment might involve a cloud or network server to help with the matching. For example, it is possible to move the majority of the intelligence to the cloud, and only use the device to collect the IDs visible via RF. There are some advantages to that, since a centralized common database could be kept, which would help the process converge more quickly. Hybrid approaches that split the work between the device and cloud are also possible. Other solutions (e.g. using indoor positioning techniques and/or GPS location information in the cloud) are also possible.

A method, apparatus and computer program product are provided in accordance with an example embodiment of the present invention in order to enable a mobile device to map unique identifiers of a mobile device to individuals.

In one embodiment, a method is provided that includes accessing user data for determining one or more nearby individuals at a first time, receiving one or more device identifiers transmitted from other electronic devices within a time period associated with the first time, and causing presentation of a mapping of the one or more device identifiers to the one or more individuals. The method may further include accessing a calendar functionality to determine the one or more nearby individuals.

The method of one embodiment may further comprise mapping the one or more device identifiers from the first time with the one or more nearby individuals at the first time. In another embodiment, the method may further include causing the user-generated data and the one or more device identifiers to be provided to a second device for mapping. In another embodiment, the method may further include determining whether each of the one or more device identifiers are mapped to a specific individual.

The method may further include, for each of the one or more device identifiers that are determined not to be mapped to a specific individual, causing the one or more device identifiers and the one or more nearby individual to be stored, accessing a storage medium storing one or more device identifiers collected at a second time and one or more nearby individuals determined to be nearby at the second time, and mapping the one or more device identifiers from the first time with the one or more nearby individuals at the first time utilizing information from the first time and the second time. The method may further include, for each of the one or more device identifiers that are determined to be mapped to a specific individual, updating frequency and time-of-day data related to the specific individual.

In another embodiment, an apparatus is provided that includes at least one processor and at least one memory including computer program code with the at least one memory and the computer program code configured to, with the processor, cause the apparatus to access user data for determining one or more nearby individuals at a first time, receive one or more device identifiers transmitted from other computing devices within a time period associated with the first time, and cause presentation of a mapping of the one or more device identifiers to the one or more individuals. The at least one memory and the computer program code may also be configured to, with the processor, cause the apparatus of one embodiment to cause the apparatus to map one or more device identifiers from the first time with the one or more nearby individuals at the first time. The at least one memory and the computer program code may also be configured to, with the processor, cause the apparatus of one embodiment to cause the apparatus to provide the user-generated data and the one or more device identifiers to a second device for mapping. The at least one memory and the computer program code may also be configured to, with the processor, cause the apparatus of one embodiment to determine whether each of the one or more device identifiers are mapped to a specific individual. The at least one memory and the computer program code may also be configured to, with the processor, cause the apparatus to access a calendar functionality to determine the expected proximity of one or more individuals.

The at least one memory and the computer program code may also be configured to, with the processor, cause the apparatus of one embodiment to, for each of the one or more device identifiers that are determined not to be mapped to a specific individual, store the one or more device identifiers and the one or more nearby individual, accessing a storage medium storing one or more device identifiers collected at a subsequent time and one or more nearby individuals determined to be nearby at the subsequent time, and mapping the one or more device identifiers from the first time with the one or more nearby individuals at the first time utilizing information from the first time and subsequent times.

In another embodiment, an apparatus is provided in which the at least one memory and the computer program code are further configured to, with the processor, cause the apparatus to, for each of the one or more device identifiers that are determined to be mapped to a specific individual, update frequency of proximity and time-of-day data related to the specific individual.

In a further embodiment, a computer program product is provided that includes at least one non-transitory computer-readable storage medium having computer-executable program code portions stored therein with the computer-executable program code portions including program code instructions for accessing user data for determining one or more nearby individuals at a first time, receiving one or more device identifiers transmitted from other computing devices within a time period associated with the first time, and causing presentation of a mapping of the one or more device identifiers to the one or more individuals. The computer-executable program code portions of one embodiment may also include program code instructions for accessing calendar functionality to determine the one or more nearby individuals.

The computer-executable program code portions of one embodiment may also include program code instructions for mapping the one or more device identifiers from the first time with the one or more nearby individuals at the first time. In another embodiment the computer-executable program code portions of one embodiment may also include program code instructions for causing the user-generated data and the one or more device identifiers to be provided to a second device for mapping. In another embodiment, the computer-executable program code portions of one embodiment may also include program code instructions for determining whether each of the one or more device identifiers are mapped to a specific individual.

The computer-executable program code portions of one embodiment may also include program code instructions for, for each of the one or more device identifiers that are determined not to be mapped to a specific individual, causing the one or more device identifiers and the one or more nearby individual to be stored, accessing a storage medium storing one or more device identifiers collected at a second time and one or more nearby individuals determined to be nearby at the second time, and mapping the one or more device identifiers from the first time with the one or more nearby individuals at the first time utilizing information from the first time and the second time. The computer-executable program code portions of one embodiment may also include program code instructions for, for each of the one or more device identifiers that are determined to be mapped to a specific individual, updating frequency and time-of-day data related to the specific individual.

BRIEF DESCRIPTION OF THE SEVERAL VIEWS OF THE DRAWINGS

Figure 1:
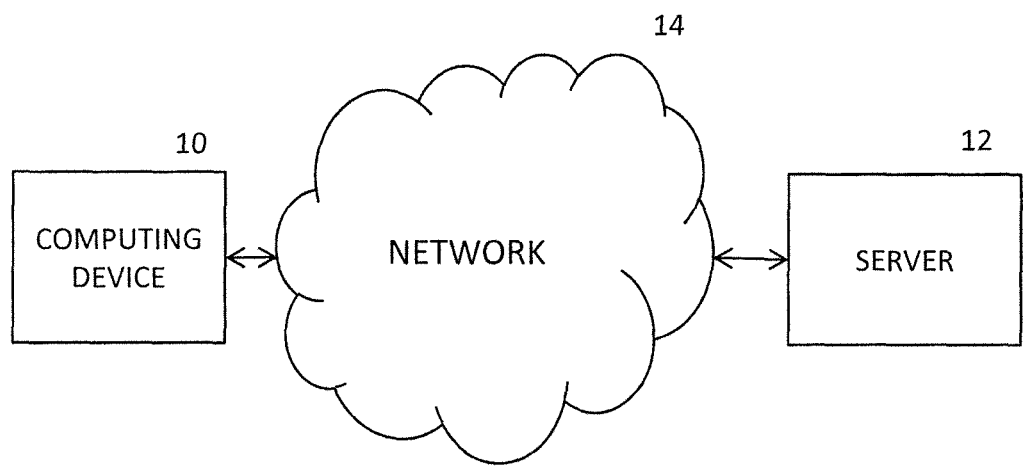
Figure 2:
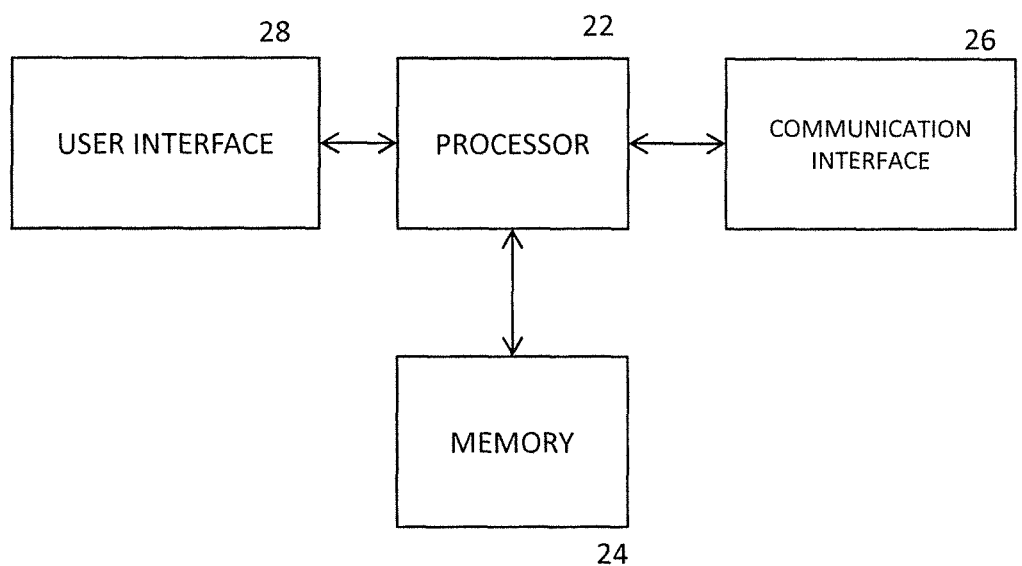
Figure 3:
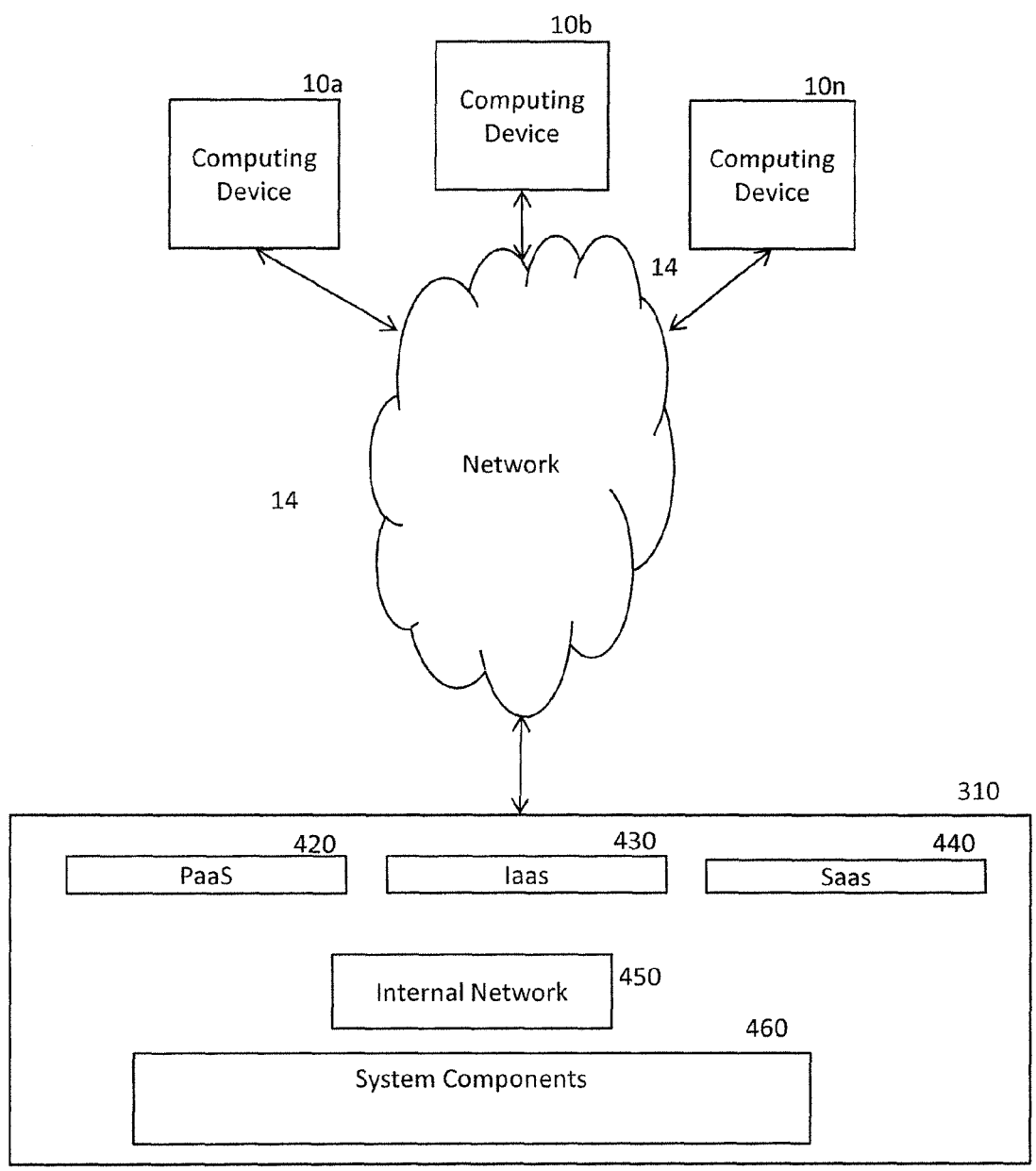

Having thus described certain embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is a schematic representation of a system that may support communications, such as computing, between a cloud computing system and a computing device.

Figure 4:
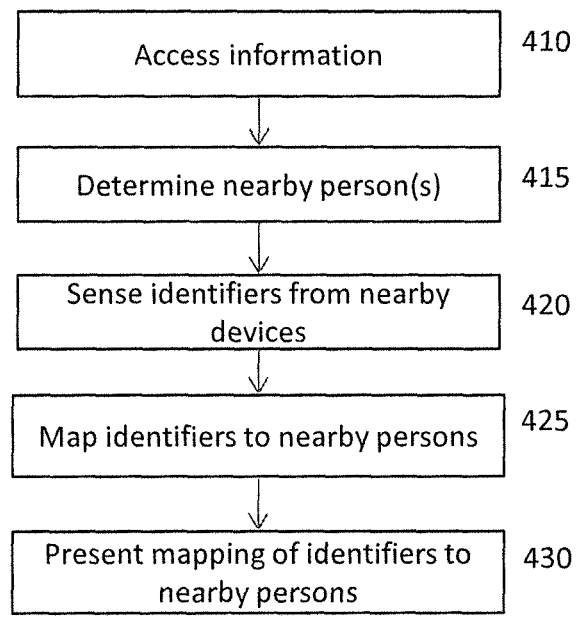
Figure 5:
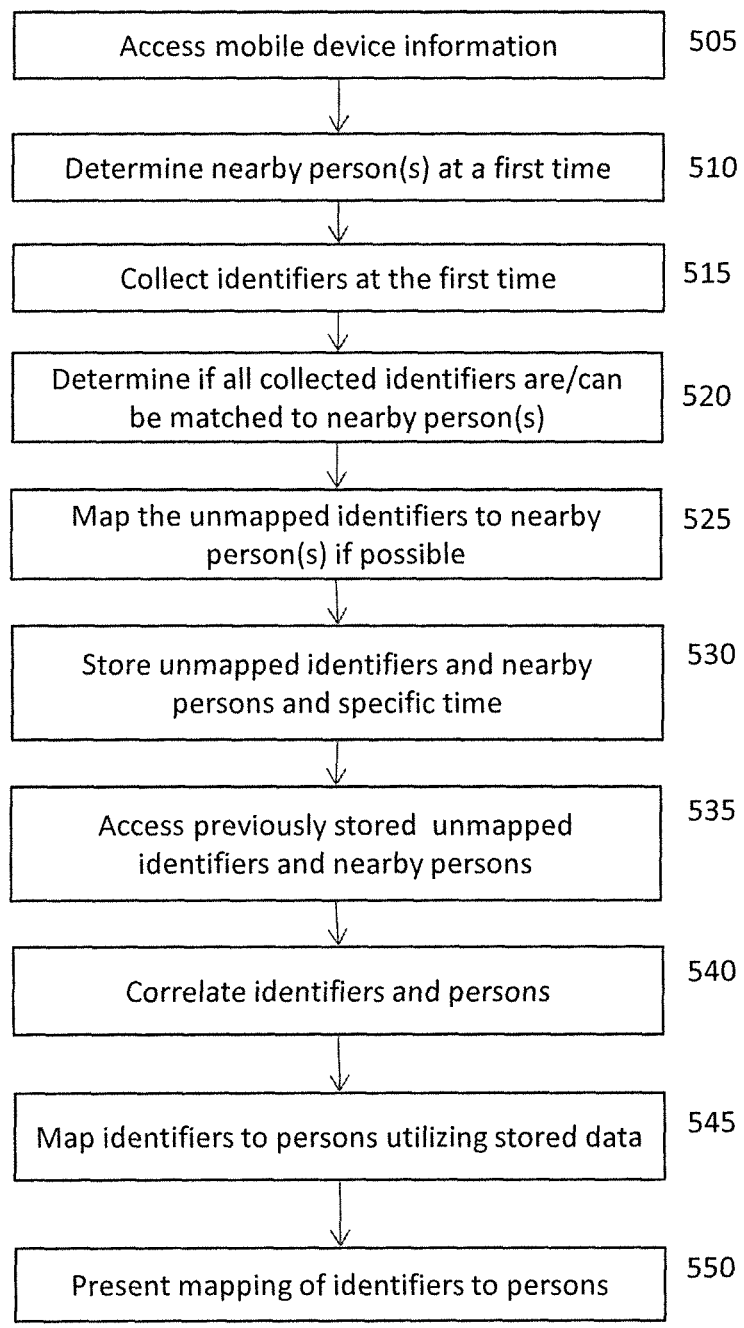
Figure 6:
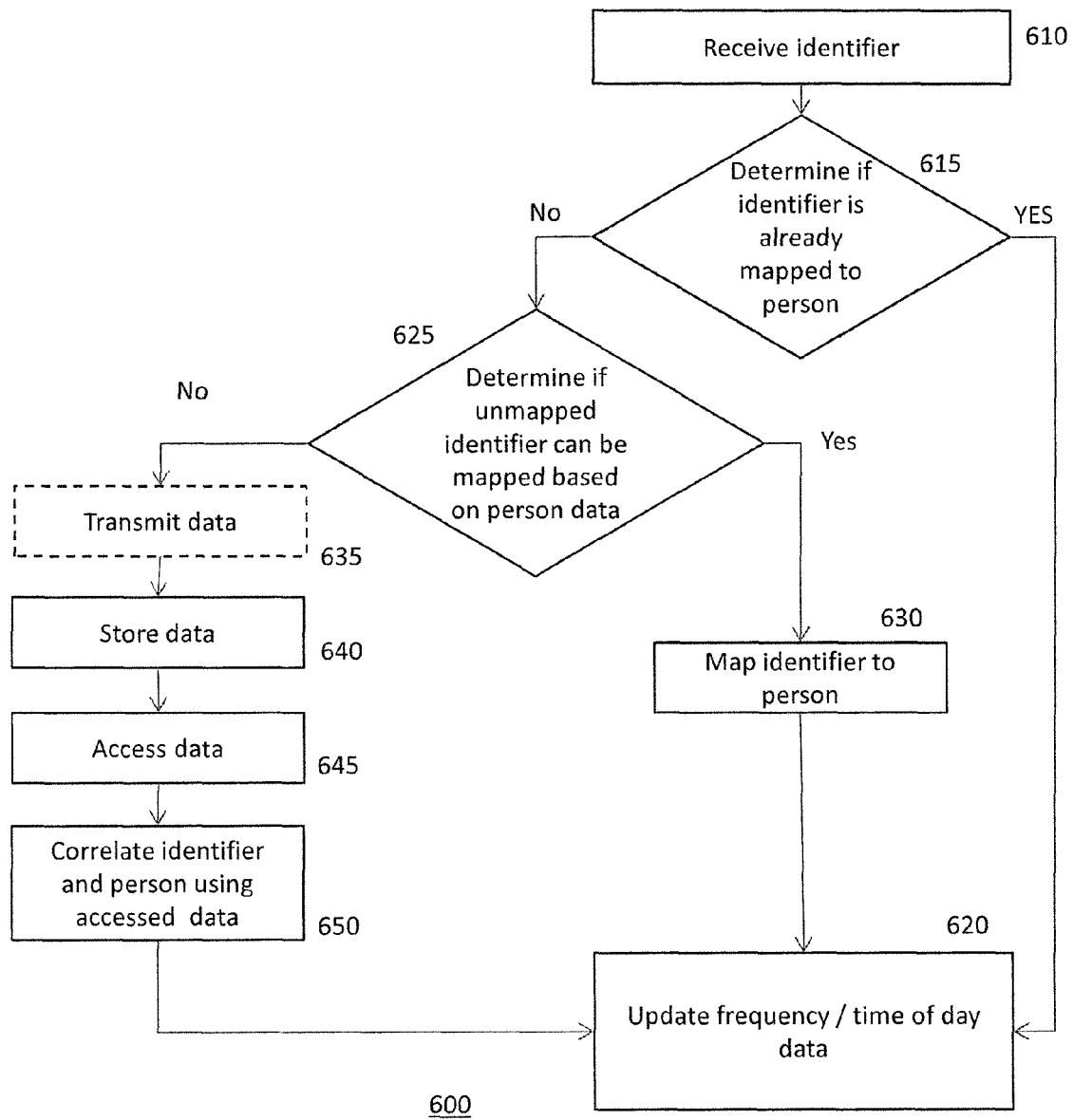

FIG. 4 is flow chart illustrating operations performed, such as by the apparatus of FIG. 2, in accordance with an example embodiment of the present invention;

FIG. 5 is a flow chart illustrating operations performed, such as by the apparatus of FIG. 2, in accordance with an example embodiment of the present invention; and FIG. 6 is a flow chart illustrating operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet or a local area network. However, the computing device and the server may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. It should be noted that while FIG. 4 illustrates one example of a configuration of an apparatus, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

As depicted in FIG. 3, computing devices 10a, 10b, and 10n are coupled to a cloud computing system 310 via network 14. In order to access information accessible from could cloud computing system 310, a browser application may run on computing devices 10a, 10b, and 10n. Browser may be configured to run within a local operating system of computing device 10. Non-limiting examples of known browser applications include Microsoft Explorer™, Apple Safari™, Mozilla™, Firefox™ and Google Chrome™ browser. Non-limiting examples of known operating systems for desktop and/or laptop computers may include Microsoft Vista™, Apple Snow Leopard™, or Linux. Examples of known operating systems for mobile devices (e.g., smartphones, netbooks, etc.) include Microsoft Windows Mobile®, Apple iOS®, and Google Android™ mobile technology platform.

Browser may enable a user to manipulate access to information accessible via network 14. For example, browser may provide a user with an ability to enter one or more uniform resource indicators (URIs, e.g., www.google.com) in order to access a web application, such as, for example, a hypertext markup language (HTML) document, or a privileged web application. A web application, and/or information used by a web application, may be stored on Cloud computing system 310. Browser may be configured to access web applications and/or other information stored on cloud computing system 310 for presentation of visual information to a user of computing device 10, among other uses. A web application, or any HTML5 or JavaScript™ application or "app", is a computer software application that is coded in a browser-supported programming language (such as JavaScript™, combined with a browser-rendered markup language like HTML5, reliant on a common web browser to render the application executable). The opening of a web page or "app" may be performed by a web browser on a user's mobile communications device 10. An HTML5 or JavaScript™ "app" allows web page script to contact a server 12, such as that shown in FIG. 1, items 12, or the cloud computing environment 310 for storing and retrieving data without the need to re-download an entire web page. A privileged web app is a piece of web content that may have been verified by, for example, means of an app store or stores or may have obtained or downloaded from a source that is trusted source.

The system 300 includes computing devices 10a, 10b, and 10n connected to a network 14 such as, for example, a Transport Control Protocol/Internet Protocol (TCP/IP) network (e.g., the Internet.) The computing devices 10a, 10b, and 10n are coupled to the cloud computing system 310. Depending on the type of cloud service provided, a computing device 10 may connect to one of three service endpoints, each of which give varying amounts of control relative to the provisioning of resources within the cloud computing system 310. For example, PaaS 320 will typically give an abstract Application Programming Interface (API) that allows developers to declaratively request or command the backend storage, computation, and scaling resources provided by the cloud, without giving exact control to the user. IaaS 330 will typically provide the ability to directly request the provisioning of resources, such as computation units (typically virtual machines), software-defined or software-controlled network elements like routers, switches, domain name servers, etc., file or object storage facilities, authorization services, database services, queue services and endpoints, etc. SaaS 340 will typically only give information and access relative to the application running on the cloud storage system, and the scaling and processing aspects of the cloud computing system will be obscured from the user.

Furthermore, a cloud computing system 310 may have an internal network 350 not visible to the outside that connect to system components 360. System components may include a memory system including system memory and user memory, processor(s), routers, switches, a message passing system, one or more service controllers, a system controller, etc. The internal network 350 may be encrypted or authenticated and in various embodiments, one or more parts of the cloud computing system 310 may be disposed on a single host.

Cloud APIs are application programming interfaces (APIs) used to build applications in the cloud computing market. Cloud APIs allow software to request data and computations from one or more services through a direct or indirect interface. Cloud APIs most commonly expose their features via representational state transfer (REST) and/or Simple Object Access Protocol (SOAP). Vendor specific and cross-platform interfaces are available for specific functions. Cross-platform interfaces have the advantage of allowing applications to access services from multiple providers without rewriting, but may have less functionality or other limitations versus vendor-specific solutions. Cloud APIs may be segmented into infrastructure, service and application clusters. Service APIs provide an interface into a specific capability provided by a service explicitly created to enable that capability. Database, messaging, web portals, mapping, e-commerce and storage are all examples of service APIs. These services may be referred to as platform as a service (PaaS).

Platform as a service (PaaS) is a category of cloud computing services that provide a computing platform and a solution stack as a service. Along with Application as a Service (SaaS) and Infrastructure as a Service (IaaS), it is a service model of cloud computing. In this model, the consumer creates the software using tools and/or libraries from the provider. The consumer also controls software deployment and configuration settings. The provider provides the networks, servers, storage and other services. PaaS offerings may also include facilities for application design, application development, testing and deployment as well as services such as team collaboration, web service integration and marshaling, database integration, security, scalability, storage, persistence, state management, application versioning, application instrumentation and developer community facilitation. These services are generally provisioned as an integrated solution over the web.

FIG. 4 shows a flow chart illustrating operations performed, such as by the apparatus 20 of FIG. 2, in accordance with an example embodiment of the present invention. In this regard, a user of the computing device 10 may engage in browsing activity (described hereinafter by way of example, but not of limitation, as one or more web pages) that the user desires to view. The browsing activity may be conducted in various manners including the entry of search queries that may be provided to the server 12 which, in turn, may provide one or more links to web pages that are responsive to the query. The user may then select or actuate one of the links to view the corresponding web page. Alternatively, the browsing activity may be conducted by entering an address, such as a uniform resource locator (URL) that identifies a web page of interest.

As shown in block 410 of FIG. 4, the apparatus 20 embodied by the computing device 10 may therefore be configured to access user-generated data. The apparatus embodied by the computing device therefore includes means, such as the processor 22, the communication interface 26 or the like, for accessing user-generated data.

A specific example in the context of an embodiment of the present invention may be accessing calendar functionality. The calendar functionality may be stored on the mobile device 10 or stored in a cloud computing environment 310. The accessed information may include a time of a meeting, a list of people invited to attend the meeting, a list of people confirmed to attend a meeting, a location of the meeting, etc.

As shown in block 415 of FIG. 4, the apparatus 20 embodied by the computing device 10 may also be configured to determine one or more nearby individuals at a first time. Thus, the apparatus may include means, such as the processor 22 or the like, for causing the execution of a determining one or more nearby individuals at a first time. In one embodiment of the present invention, the method assumes that a user operating the mobile device 10 comprising a processor configured for accessing calendar functionality will attend a meeting scheduled in the accessed calendar. Furthermore, any individual invited or confirmed to attend may be determined to be nearby or in close enough proximity to the user of the mobile device at a first time, the start time of the meeting, or for a scheduled or predetermined duration from the start time of the meeting to be considered nearby. In another embodiment, a nearby individual is determined to be those individuals who, if carrying communication devices, could be discovered by proximity based sensing (e.g. Bluetooth, wi-fi, RF based communications, etc).

The apparatus 20 embodied by the computing device 10 may also be configured to receive one or more device identifiers from other computing devices within a time period associated with the first time. Thus, the apparatus may include means, such as the processor 22 or the like, for causing receiving one or more device identifiers from other computing devices within a time period associated with the first time. See block 420 of FIG. 4. In one embodiment of the present invention, computing devices, such as mobile phones or tablet computers may incorporate any of a number of RF-based digital communications methods. Examples may include various cellular voice and data technologies, Bluetooth, Wi-Fi, and proprietary standards such as ANT. These standards may broadcast the signal in an omni-directional pattern and because there is no fixed relationship between the transmitter and receiver, any appropriately equipped receiver within range can receive the signal. To receive unique identifiers in proximity to a user's mobile device, RF based communications methods may be utilized. These RF-based digital communication methods may incorporate two unique identifiers, so that a transmitter can indicate whom the transmission is intended for, and where the intended receiver should send the response, if any.

The apparatus 20 embodied by the computing device 10 may also be configured to map the one or more device identifiers with the one or more nearby individuals. Thus, the apparatus may include means, such as the processor 22 or the like, for causing the mapping the one or more device identifiers from the first time with the one or more nearby individuals at the first time. See block 425 of FIG. 4. In one embodiment of the present invention, one individual may be determined to be nearby and one device identifier may be received. In that instance, the device identifier is mapped to the individual. In another embodiment, more than one device identifier may be received and one or more individuals may be determined to be nearby. In this instance, a more rigorous process may be employed, which will be discussed later.

The apparatus 20 embodied by the computing device 10 may also be configured to cause presentation of a mapping of the one or more device identifiers to the one or more individuals. Thus, the apparatus may include means, such as the processor 22 or the like, for causing presentation of a mapping of the one or more device identifiers to the one or more individuals. See block 430 of FIG. 4. In one embodiment, presentation of the mapping may be made on a map functionality. In another embodiment, a calendar functionality may be utilized. In another embodiment, a user may be shown which individuals are present or information related to present individuals may be stored based on the mapping.

Referring now to FIG. 5, a flow chart is depicted that illustrates operations performed, such as by the apparatus 20 of FIG. 2, in accordance with an example embodiment of the present invention. As shown in block 505 of FIG. 5, the apparatus 20 embodied by the computing device 10 may therefore be configured to access data. The apparatus embodied by the computing device therefore includes means, such as the processor 22, the communication interface 26 or the like, for accessing data. By way of example in which the computing device 10 is a mobile telephone operating a version iOS, Android, or Windows, accessing data may include accessing an Outlook calendar, a Google calendar, or the like. The calendar functionality may be stored on the mobile telephone, in the cloud, or a remote server. In one embodiment, the computing device may access information on a desktop computer when docked.

In this embodiment, the apparatus 20 embodied by the computing device 10 may also be configured to determine one or more nearby individuals, as shown in block 510 of FIG. 5. Thus, the apparatus may include means, such as the processor 22 or the like, for causing determination of one or more nearby individuals. In the context of the above example, the mobile telephone may determine that each of the individuals invited or confirmed for a lunch meeting are nearby at the scheduled time. For example, a user may have a meeting scheduled with Ann, Bob, Carol, Dylan, and Eric at 2 p.m. The mobile telephone may determine that at 2 p.m. that such attendees are nearby.

The apparatus 20 embodied by the computing device 10 may also be configured to receive one or more device identifiers transmitted from other computing devices within a time period associated with the first time. See block 515 of FIG. 5. Thus, the apparatus may include means, such as the processor 22 or the like, for causing reception of one or more device identifiers transmitted from other computing devices within a time period associated with the first time. In the context of the above example, the mobile telephone may be configured to receive identifiers at 2 p.m.

The apparatus 20 embodied by the computing device 10 may also be configured to determine if all collected identifiers are be matched to nearby person(s). See block 520 of FIG. 5. Thus, the apparatus may include means, such as the processor 22 or the like, for causing determination of whether all collected identifiers are be matched to nearby person(s). In one embodiment, computing device 10 may also be configured to determine if all collected identifiers are able to be matched to nearby person(s). Thus, the apparatus may include means, such as the processor 22 or the like, for causing determination of whether all collected identifiers are able to be matched to nearby person(s). In the context of the above example, a mobile telephone may receive two device identifiers at a time that two individuals are determined to be nearby. Without any other information, the mobile telephone may determine that both identifiers are unable to be matched to nearby individuals. In the context of the above example, where a mobile telephone receives device identifiers 1, 2, 3, 4, and 5 and Ann, Bob, Carol, Dylan, and Eric are determined to be nearby, the mobile telephone may determine that the device identifiers are unable to be mapped to a specific individual. In one embodiment of the present invention, the mobile device of the user may not be the only mobile device configured according to the present invention. In one embodiment, Ann and Bob may carry mobile devices configured according to the present invention. Ann and Bob's mobile devices may identify themselves to each other, by communicating directly. In an alternative embodiment, Ann and Bob's mobile devices, each enabled according to the present invention, may be configured to identify themselves to an intermediary device and/or cloud-based system.

In another embodiment of the present invention, identification may be associated with a level of confidence. In the example above, Ann and Bob's mobile devices are configured according to the present invention. Both devices may collect three nearby identifiers and determine that Carol, Dylan and Eric are nearby. Ann and bob's devices may then determine that the collected device identifiers may not be mapped. Ann and Bob's devices may determine that there exists equal probability that each of the identifiers maps to one of Carol, Dylan, and Eric.

The apparatus 20 embodied by the computing device 10 may also be configured to map the one or more device identifiers from the first time with the one or more nearby individuals at the first time. Thus, the apparatus may include means, such as the processor 22 or the like, for causing mapping the one or more device identifiers from the first time with the one or more nearby individuals at the first time. See block 525 of FIG. 5. If the determination at step 520 concludes that a device identifier is able to be mapped to an individual, information is stored relating the device identifier to the individual. The information may be stored locally or remotely. In an example where Carol is determined to be nearby based on a lunch meeting at noon and the mobile telephone receives one device identifier 3, the mobile telephone may be configured to map Carol to device identifier 3. Additionally or alternatively Carol may be determined to be nearby based on a lunch meeting and the mobile telephone may receive one device identifier. In this case, the mobile telephone may be configured to map Carol to device identifier 3 with a high level of confidence. In an alternative embodiment, Dylan may be determined to be nearby based on a scheduled lunch meeting. The mobile telephone may receive a plurality of device identifiers from other mobile devices in a crowded restaurant. In this embodiment, the mobile telephone may be configured to determine a mapping based on information regarding proximity for a predetermined period of time, proximity for a period of time determined to be the longest, or proximity for the longest unbroken period of time, or proximity for the most time during a period of time.

In a case where one or more device identifiers are unable to be mapped to an individual, information is stored relating the one or more device identifiers, one or more individuals determined to be nearby and the specific time, the apparatus 20 embodied by the computing device 10 may also be configured to store information relating the one or more device identifiers, one or more individuals determined to be nearby and the specific time. See block 530 of FIG. 5. Thus, the apparatus may include means, such as the processor 22 or the like, for causing the storing of information relating the one or more device identifiers, one or more individuals determined to be nearby and the specific time. In one embodiment, information may be stored locally on the mobile telephone. In alternative embodiments, the information is stored remotely. In the context of the above example, when individuals Dylan and Eric are determined to be nearby at meeting time and one or more device identifies are received, the mobile telephone may store information relating individuals Dylan and Eric with the device identifiers received during the period of time those individuals were determined to be nearby.

The apparatus 20 embodied by the computing device 10 may also be configured to access previously stored information. See block 535 of FIG. 5. Thus, the apparatus may include means, such as the processor 22 or the like, for causing the accessing of previously stored information. In one embodiment, the previously stored information is information relating one or more unmapped device identifiers to one or more unmapped individuals who were determined to be nearby the unmapped device identifiers at a second time or at a time period associated with the second time. In the context of the above examples, the mobile device may access previously stored information related to a lunch meeting with Carol and Eric where two device identifiers were collected.

The apparatus 20 embodied by the computing device 10 may also be configured to correlate device identifiers and individuals. See block 540 of FIG. 5. Thus, the apparatus may include means, such as the processor 22 or the like, for causing correlation of device identifiers and individuals determined to be nearby at a time that the device identifiers are received. In the context of the above example, where Dylan and Eric are determined to be nearby and two device identifiers are received, the mobile device may determine that each device identifier may map to Dylan and Eric equally. When information regarding a previous meeting where Carol and Eric were determined to be present and two device identifiers were received and each was determined to map to Carol and Eric equally, correlation may be made. Here, based on the determination that Carol was present at both times, a device identifier that was received both times may be mapped to Carol with increased level of confidence.

The apparatus 20 embodied by the computing device 10 may also be configured to map device identifiers to individuals using previously stored data. See block 545 of FIG. 5. Thus, the apparatus may include means, such as the processor 22 or the like, for causing mapping of device identifiers to individuals using previously stored data. In the context of the above embodiment, the mobile device may map the second device identifier received at the meeting with Carol and Dylan to Dylan after the first identifier is mapped to Carol, based on the presence of Carol and the first identifier at the meeting with Eric. In another embodiment, one or more mobile devices configured according to the present invention may communicate directly with other capable devices or with a network and/or cloud based system when association are made, mapping information is received, and/or correlations are made.

The apparatus 20 embodied by the computing device 10 may also be configured to cause presentation of a mapping of the one or more device identifiers to the one or more individuals. See block 550 of FIG. 5. Thus, the apparatus may include means, such as the processor 22 or the like, for causing presentation of a mapping of the one or more device identifiers to the one or more individuals.

Referring now to FIG. 6, a flow chart 600 is provided illustrating operations related to updating frequency data and time of day data associated with mapped device identifiers, such as by the apparatus 20 of FIG. 2. In accordance with an example embodiment of the present invention, the apparatus 20 embodied by the computing device 10 may also be configured to receive a device identifier. See block 610 of FIG. 6. Thus, the apparatus may include means, such as the processor 22 or the like, for causing the reception of device identifier.

The apparatus 20 embodied by the computing device 10 may also be configured to determine if the device identifier is mapped to an individual. See block 615 of FIG. 6. Thus, the apparatus may include means, such as the processor 22 or the like, for causing determination of whether a received device identifier is mapped to an individual.

If the determination of step 615 concludes that the device identifier is mapped to an individual, the apparatus 20 embodied by the computing device 10 may also be configured to update frequency and/or time of day data related to the individual. See block 620 of FIG. 6. Thus, the apparatus may include means, such as the processor 22 or the like, for causing updating of frequency and/or time of day data related to the individual.

If the determination of step 615 concludes that the device identifier is not mapped to an individual, the apparatus 20 embodied by the computing device 10 may also be configured to determine if the device identifier is able to be mapped to an individual. See block 625 of FIG. 6. Thus, the apparatus may include means, such as the processor 22 or the like, for causing the determination of whether the device identifier is able to be mapped to an individual. In one embodiment, in order to determine whether the device identifier is able to mapped, the computing device accesses stored information, such as information stored in a calendar application or an email application.

If the determination of step 625 concludes that the device identifier is able to be mapped to an individual, the apparatus 20 embodied by the computing device 10 may also be configured to map the device identifier to an individual. See block 630 of FIG. 6. Thus, the apparatus may include means, such as the processor 22 or the like, for causing the mapping of a device identifier to an individual.

If the determination of step 625 concludes that the device identifier is not able to be mapped to an individual, the apparatus 20 embodied by the computing device 10 may also be configured to transmit the data to a remote system. See block 635 of FIG. 6. Thus, the apparatus may include means, such as the processor 22 or the like, for causing the transmission of the data to a remote system. In one embodiment, the computing device transmits the device identifier to a remote system. In an alternative embodiment, the computing device may be configured to transmit the device identifier, one or more individuals determined to be nearby, calendar data, time data, duration data, etc.

If the determination of step 625 concludes that the device identifier is not able to be mapped to an individual, the apparatus 20 embodied by the computing device 10 may also be configured to store the data. See block 640 of FIG. 6. Thus, the apparatus may include means, such as the processor 22 or the like, for causing the storage of data. In one embodiment of the present invention, the computing device stores the device identifier. In an alternative embodiment, the computing device may be configured to store the device identifier, one or more individuals determined to be nearby, calendar data, time data, duration data, etc.

If the determination of step 625 concludes that the device identifier is not able to be mapped to an individual, the apparatus 20 embodied by the computing device 10 may also be configured to access previously stored data. See block 645 of FIG. 6. Thus, the apparatus may include means, such as the processor 22 or the like, for causing the accessing of stored data. In one embodiment of the present invention, the computing device accesses information regarding the device identifier. In an alternative embodiment, the computing device may be configured to access information regarding the device identifier, time data related to a second time that the device identifier was received, one or more individuals determined to be nearby at the second time or within a time associated with the second time, calendar data related to the second time, etc.

The apparatus 20 embodied by the computing device 10 may also be configured to correlate device identifiers and individuals using stored data. See block 540 of FIG. 5. Thus, the apparatus may include means, such as the processor 22 or the like, for causing correlation of device identifiers and individuals using stored data. In one embodiment, correlation is performed using process of elimination. In another embodiment of the present invention, individuals determined to be nearby at a second time that the device identifier was received are factored into the correlation.

As described above, FIGS. 4, 5 and 6 illustrate flowcharts of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    accessing user data for determining an identification of one or more nearby individuals at a first time, a nearby individual being an individual who, if carrying a communication device, the communication device able to be discovered by proximity based sensing;
    receiving one or more device identifiers transmitted from other computing devices within a time period associated with the first time;
    subsequent to determining the identification of the nearby individuals and receiving the one or more device identifiers,
        determining that at least one of the nearby individuals is not mapped to a device identifier, and
        determining that at least one of the one or more device identifiers is not mapped to a nearby individual;
        in an instance in which a determination that at least one of the nearby individuals is not mapped to a device identifier and that at least one of the one or more device identifiers is not mapped to a nearby individual,
        correlating the at least one of the one or more device identifiers with at least one of the one or more nearby individuals; and
        causing presentation of a mapping of the at least one of the one or more device identifiers to the at least one of the one or more nearby individuals.

2. The method of claim 1, further comprising mapping the one or more device identifiers from the first time with the one or more nearby individuals at the first time.

3. The method of claim 1, further comprising causing the user-generated data and the one or more device identifiers to be provided to a second device for mapping.

4. The method of claim 1, further comprising determining whether each of the one or more device identifiers are mapped to a specific individual.

5. The method of claim 4, further comprising:
    for each of the one or more device identifiers that are determined not to be mapped to a specific individual, causing the one or more device identifiers and the one or more nearby individual to be stored;
    accessing a storage medium storing one or more device identifiers collected at a second time and one or more nearby individuals determined to be nearby at the second time; and
    mapping the one or more device identifiers from the first time with the one or more nearby individuals at the first time utilizing information from the first time and the second time.

6. The method of claim 4, further comprising for each of the one or more device identifiers that are determined to be mapped to a specific individual, updating frequency and time-of-day data related to the specific individual.

7. The method of claim 1, further comprising accessing a calendar functionality to determine the one or more nearby individuals.

8. An apparatus comprising at least one processor and at least one memory including computer program code, the at least one memory and the computer program code configured to, with the processor, cause the apparatus to at least:
    access user data for determining an identification of one or more nearby individuals at a first time, a nearby individual being an individual who, if carrying a communication device, the communication device able to be discovered by proximity based sensing;
    receive one or more device identifiers transmitted from other computing devices within a time period associated with the first time;

subsequent to determining the identification of the nearby individuals and receiving the one or more device identifiers,
determine that at least one of the nearby individuals is not mapped to a device identifier, and
determine that at least one of the one or more device identifiers is not mapped to a nearby individual;
in an instance in which a determination that at least one of the nearby individuals is not mapped to a device identifier and that at least one of the one or more device identifiers is not mapped to a nearby individual,
correlate the at least one of the one or more device identifiers with at least one of the one or more nearby individuals; and
cause presentation of a mapping of at least one of the of the one or more device identifiers to the at least one of the one or more nearby individuals.

9. An apparatus according to claim 8 wherein the at least one memory and the computer program code are further configured to, with the processor, cause the apparatus to map one or more device identifiers from the first time with the one or more nearby individuals at the first time.

10. An apparatus according to claim 8 wherein the at least one memory and the computer program code are further configured to, with the processor, cause the apparatus to provide the user-generated data and the one or more device identifiers to a second device for mapping.

11. An apparatus according to claim 8 wherein the at least one memory and the computer program code are further configured to, with the processor, cause the apparatus to determine whether each of the one or more device identifiers are mapped to a specific individual.

12. An apparatus according to claim 11, wherein the at least one memory and the computer program code are further configured to, with the processor, cause the apparatus to, for each of the one or more device identifiers that are determined not to be mapped to a specific individual, store the one or more device identifiers and the one or more nearby individual;
access a storage medium storing one or more device identifiers collected at a second time and one or more nearby individuals determined to be nearby at the second time; and
map the one or more device identifiers from the first time with the one or more nearby individuals at the first time utilizing information from the first time and the second time.

13. An apparatus according to claim 11, wherein the at least one memory and the computer program code are further configured to, with the processor, cause the apparatus to, for each of the one or more device identifiers that are determined to be mapped to a specific individual, update frequency and time-of-day data related to the specific individual.

14. An apparatus according to claim 8, wherein the at least one memory and the computer program code are further configured to, with the processor, cause the apparatus to access a calendar functionality to determine the one or more nearby individuals.

15. A computer program product comprising at least one non-transitory computer-readable storage medium having computer-executable program code portions stored therein, the computer-executable program code portions comprising program code instructions for:
accessing user data for determining an identification of one or more nearby individuals at a first time, a nearby individual being an individual who, if carrying a communication device, the communication device able to be discovered by proximity based sensing;
receiving one or more device identifiers transmitted from other computing devices within a time period associated with the first time;
subsequent to determining the identification of the nearby individuals and receiving the one or more device identifiers,
determining that at least one of the nearby individuals is not mapped to a device identifier, and
determining that at least one of the one or more device identifiers is not mapped to a nearby individual;
in an instance in which a determination that at least one of the nearby individuals is not mapped to a device identifier and that at least one of the one or more device identifiers is not mapped to a nearby individual,
correlating the at least one of the one or more device identifiers with at least one of the one or more nearby individuals; and
causing presentation of a mapping of the at least one of the one or more device identifiers to the at least one of the one or more nearby individuals.

16. A computer program product according to claim 15, wherein the computer-executable program code portions further comprise program code instructions for mapping the one or more device identifiers from the first time with the one or more nearby individuals at the first time.

17. A computer program product according to claim 15, wherein the computer-executable program code portions further comprise program code instructions for causing the user-generated data and the one or more device identifiers to be provided to a second device for mapping.

18. A computer program product according to claim 15, wherein the computer-executable program code portions further comprise program code instructions for determining whether each of the one or more device identifiers are mapped to a specific individual.

19. A computer program product according to claim 18, wherein the computer-executable program code portions further comprise program code instructions for, for each of the one or more device identifiers that are determined not to be mapped to a specific individual, causing the storage of the one or more device identifiers and the one or more nearby individual; accessing a storage medium storing one or more device identifiers collected at a second time and one or more nearby individuals determined to be nearby at the second time; and mapping the one or more device identifiers from the first time with the one or more nearby individuals at the first time utilizing information from the first time and the second time.

20. A computer program product according to claim 18, wherein the computer-executable program code portions further comprise program code instructions for, for each of the one or more device identifiers that are determined to be mapped to a specific individual, updating frequency and time-of-day data related to the specific individual.

21. A computer program product according to claim 15, wherein the computer-executable program code portions further comprise program code instructions for accessing a calendar functionality to determine the one or more nearby individuals.

* * * * *